(12) United States Patent
Ovalle et al.

(10) Patent No.: US 12,227,370 B2
(45) Date of Patent: Feb. 18, 2025

(54) APPARATUSES AND METHODS FOR MEASURING DUSTINESS OF A PRODUCT

(71) Applicant: PetSmart Home Office, Inc., Phoenix, AZ (US)

(72) Inventors: Saul C. Ovalle, Murrieta, CA (US); James Schnepf, Phoenix, AZ (US); Amy Euske, Scottsdale, AZ (US)

(73) Assignee: PETSMART HOME OFFICE, INC., Phoenix, AZ (US)

( * ) Notice: Subject to any disclaimer, the term of this patent is extended or adjusted under 35 U.S.C. 154(b) by 0 days.

(21) Appl. No.: 18/386,810

(22) Filed: Nov. 3, 2023

(65) Prior Publication Data

US 2024/0190664 A1 Jun. 13, 2024

Related U.S. Application Data

(63) Continuation of application No. 18/077,792, filed on Dec. 8, 2022, now Pat. No. 11,840,408.

(51) Int. Cl.
*B65G 47/44* (2006.01)
*B65G 11/02* (2006.01)
(Continued)

(52) U.S. Cl.
CPC ............ *B65G 47/44* (2013.01); *B65G 11/023* (2013.01); *B65G 11/203* (2013.01); *G01N 15/02* (2013.01);
(Continued)

(58) Field of Classification Search
CPC .... B65G 11/023; B65G 11/203; B65G 47/44; B07C 5/342; G01N 15/02
(Continued)

(56) References Cited

U.S. PATENT DOCUMENTS 3,739,893 A * 6/1973 Kaufmann ........... B65G 69/186
141/93
4,029,220 A * 6/1977 Greaves .................... F27B 1/20
193/29
(Continued)

FOREIGN PATENT DOCUMENTS

CA           3022676 A1   11/2017
CN          109463289 A    3/2019
(Continued)

OTHER PUBLICATIONS

Cliff, M.A. and Heymann, H., Physical and Sensory Characteristics of Cat Litter, Journal of Sensory Studies May 2007.
(Continued)

*Primary Examiner* — Douglas A Hess
(74) *Attorney, Agent, or Firm* — BRYAN CAVE LEIGHTON PAISNER LLP (57) ABSTRACT

A method for measuring dustiness of a product. The method can include providing the product onto a ramp. The method further can include allowing gravity to move the product down the ramp through a dam. The dam can be configured to control a mass flow rate of the product moved down the ramp. The method additionally can include measuring, by a sensor, airborne particles to determine the dustiness of the product, wherein the airborne particles are generated by the product exiting the ramp and freely falling onto a support surface. Other embodiments are disclosed.

20 Claims, 6 Drawing Sheets

(51) Int. Cl.
*B65G 11/20* (2006.01)
*G01N 15/02* (2024.01)

(52) U.S. Cl.
CPC ............... *B65G 2203/0208* (2013.01); *B65G 2203/042* (2013.01)

(58) Field of Classification Search
USPC .................................................. 193/2 R, 33
See application file for complete search history.

(56) References Cited

U.S. PATENT DOCUMENTS

| | | | | | |
|---|---|---|---|---|---|
| 5,289,909 | A | * | 3/1994 | Maxwell | B65G 69/16 |
| | | | | | 193/25 E |
| 5,697,408 | A | | 12/1997 | Reeves | |
| 5,803,695 | A | * | 9/1998 | Schlagel | B65G 47/72 |
| | | | | | 414/301 |
| 5,868,234 | A | * | 2/1999 | Morimoto | B65G 69/16 |
| | | | | | 193/12 |
| 6,866,071 | B2 | * | 3/2005 | Fischer | B65G 69/181 |
| | | | | | 193/30 |
| 8,161,790 | B2 | | 4/2012 | Ayers | |
| 8,386,275 | B2 | * | 2/2013 | Chambers | G06Q 50/22 |
| | | | | | 705/2 |
| 8,550,384 | B2 | * | 10/2013 | Nitta | A01F 29/005 |
| | | | | | 241/62 |
| 8,622,187 | B2 | * | 1/2014 | Ungerechts | B65G 69/181 |
| | | | | | 193/15 |
| 8,695,903 | B2 | | 4/2014 | Gillis | |
| 8,944,255 | B2 | * | 2/2015 | Ito | B65G 11/023 |
| | | | | | 209/707 |
| 9,643,789 | B2 | * | 5/2017 | Teichrob | B65G 41/001 |
| 9,968,942 | B2 | | 5/2018 | Gillespie | |
| 10,684,222 | B2 | | 6/2020 | Horiuchi et al. | |
| 11,186,454 | B2 | * | 11/2021 | Warren | B03C 3/82 |
| 11,667,481 | B2 | * | 6/2023 | Niemi | B65G 47/95 |
| | | | | | 193/2 R |
| 2013/0305997 | A1 | | 11/2013 | Miller et al. | |
| 2013/0319341 | A1 | | 12/2013 | Zhang et al. | |
| 2018/0177150 | A1 | | 6/2018 | Seguin-Laur | |
| 2019/0274274 | A1 | | 9/2019 | Huck | |
| 2020/0404881 | A1 | | 12/2020 | Skaf | |
| 2021/0169037 | A1 | | 6/2021 | Nuanes et al. | |
| 2022/0063690 | A1 | | 3/2022 | Hogg et al. | |

FOREIGN PATENT DOCUMENTS

| | | |
|---|---|---|
| CN | 110100746 A | 8/2019 |
| CN | 20997938 U | 1/2020 |
| CN | 111011226 A | 4/2020 |
| CN | 109073522 B | 6/2021 |
| CN | 113439668 A | 9/2021 |
| CN | 113439669 A | 9/2021 |
| DE | 102012003987 A1 | 8/2013 |
| JP | 2007089592 A | 4/2007 |
| KR | 20210074666 A | 6/2021 |
| WO | 2013162640 A1 | 10/2013 |
| WO | 2020114504 A1 | 6/2020 |
| WO | 2020174400 A1 | 9/2020 |

OTHER PUBLICATIONS

Shapiro, I., Common Mistakes in Indoor Air Quality Calculations, Invironment Professional, vol. 2, No. 8 Aug. 1996.

U.S. Environmental Protection Agency, Revised Air Quality Standards for Particle Pollution and Updates to the Air Quality Index (AQI) Dec. 14, 2012.

Richards, J.R., Control of Particulate Matter Emissions, Student Manual, APTI Course 413, Third Edition, U.S. Environmental Protection Agency Jan. 2000.

* cited by examiner

┌─────────────────────────────────────────────────────────────────────┐
│ 610 Providing a product onto a ramp                                 │
│  ┌───────────────────────────────────────────────────────────────┐  │
│  │ 611 Using a container to hold the product and opening a door  │◄─
│  │     of the container to discharge the product from the        │  │
│  │     container onto the ramp                                   │  │
│  └───────────────────────────────────────────────────────────────┘  │
└─────────────────────────────────────────────────────────────────────┘
                                    │
                                    ▼
┌─────────────────────────────────────────────────────────────────────┐
│ 620 Allowing gravity to move the product down the ramp, toward a    │
│     discharging end of the ramp, and to exit the ramp through a     │
│     dam at the discharging end of the ramp                          │
│  ┌───────────────────────────────────────────────────────────────┐  │
│  │ 621 Allowing the gravity to move the product from the door    │  │
│  │     of the container onto the ramp, down the ramp, toward     │  │
│  │     the discharging end of the ramp, and to exit the ramp     │  │
│  │     through the dam at the discharging end of the ramp        │  │
│  └───────────────────────────────────────────────────────────────┘  │
└─────────────────────────────────────────────────────────────────────┘
                                    │
                                    ▼
┌─────────────────────────────────────────────────────────────────────┐
│ 630 Measuring, by a sensor, airborne particles to determine the     │
│     dustiness of the product                                        │
│  ┌───────────────────────────────────────────────────────────────┐  │
│  │ 631 Measuring, by the sensor, the airborne particles against  │  │
│  │     a background color of at least portion of a wall to       │──┘
│  │     determine the dustiness of the product                    │
│  └───────────────────────────────────────────────────────────────┘  │
└─────────────────────────────────────────────────────────────────────┘

FIG. 6

APPARATUSES AND METHODS FOR MEASURING DUSTINESS OF A PRODUCT

CROSS-REFERENCE TO RELATED APPLICATIONS

This application is a continuation of U.S. patent application Ser. No. 18/077,792, filed Dec. 8, 2022. U.S. patent application Ser. No. 18/077,792 is incorporated herein by reference in its entirety.

TECHNICAL FIELD

This disclosure relates generally to apparatuses and methods for measuring dustiness of a product.

BACKGROUND

Many products, such as cat litter, drywall compounds, etc., can generate dust and pollute the air when in use. Some of the products claim to be low-dust, but without a standard for comparison, consumers can only rely on the manufacturers' assertions of efficacy in dust control. Therefore, a need exists for apparatuses and methods for measuring dustiness of a product.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise.

Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Various embodiments include an apparatus for measuring dustiness of a product. The product can be any dust generating products, such as cat litter (e.g., a sodium bentonite clay litter, a wheat-based cat litter, a sawdust cat litter, a pine pellet cat litter, etc.). The apparatus can include a wall, a ramp, and a sensor. The ramp can include a dam, a receiving end, and a discharging end opposite the receiving end. The ramp can be configured to receive, at the receiving end, the product. The ramp further can be configured to allow gravity to move the product from the receiving end toward the discharging end to exit the ramp. The discharging end of the ramp can be located between the sensor and the wall. The dam can be configured to control a mass flow rate of the product exiting the ramp. In some embodiments, the ramp further can include an angle of inclination relative to a support surface (e.g., a surface substantially parallel to a floor or a virtual horizontal line). Examples of the angle of inclination can include 45 degrees) (°), 48°, 53°, 58°, 61°, or any suitable angle (e.g., approximately 45 to 63 degrees or 50 to 60 degrees, etc.) to facilitate a smooth movement of the product down the ramp.

In many embodiments, the sensor can include any suitable devices configured to measure airborne particles generated by the product exiting the ramp and freely falling onto the support surface (e.g., a floor, a bottom plate, or a bottom of a tray) to determine the dustiness of the product. Examples of the sensor can include particle counters using various particle detecting techniques, such as light blocking, light scattering, photon counting, direct imaging, resistive pulse sensing, and so forth. The output of the sensor can be a quantity and/or a mass concentration (e.g., a density) of dust particles in the air measured at a certain point of time or in a certain time interval. The airborne particles detectable by the sensor can have one or more particle sizes or dimensions (e.g., 0.3 micrometer (μm), 1.0 μm, 2.5 μm, 10.0 μm, 25.0 μm, etc.). In some embodiments, the sensor further can include one or more user-configurable options, such as the number of particle size channels for simultaneous measurements, the respective size or dimension of particles to be measured in each particle size channel, a sampling frequency, etc. The sensor can include one or more additional components, such as a temperature sensor, a relative humidity sensor, an isokinetic probe, a vacuum, a process chamber, a display, a battery, a vacuum pump, one or more input controls, etc. In certain embodiments, the sensor can include a vacuum pump, a chamber, and a particle counter. To determine the dustiness, the sensor can be configured to use the vacuum pump to suck in a sample of the surrounding air into the chamber and use the particle counter to count the particles in the sample and measure the respective size of each particle. The sensor can be a stand-alone device or electronically coupled to or communicable with a computer.

In some embodiments, the sensor further can include an adjustable height. The height of the sensor can be adjusted by a sensor holder of the apparatus. In certain embodiments, the sensor holder can include at least one rail with multiple height levels (e.g., rack rails, vertical mount rails, etc.) and a platform configured to support the sensor at one of the multiple height levels. The multiple height levels can be unevenly or evenly spaced apart (e.g., 3 centimeters (cm), 1 inch, 5 cm, etc.).

In a number of embodiments, the apparatus further can include a container (e.g., a feed hopper bin) located at a first side of the wall while the discharge end of the ramp is located at a second side of the wall that is opposite the first side of the wall. The container can include a container body configured to hold the product. In some embodiments, the container body further can include a discharge opening that can be closed or opened by a door of the container. In similar or different embodiments, when the door is open, the container body can discharge the product through the discharge opening to the receiving end of the ramp. In certain embodiments, the door and the ramp can be configured so that the door, when open, lies on the ramp. For example, the door can be hinged at the rear wall of the container body and opened and/or closed by a latch. The latch further can be coupled to a wire for a user to pull to easily open the door. When the door is opened by pulling the latch and/or the wire coupled to the latch, the door can swing and lie flat on a surface of the ramp. In several embodiments, the container body also can include a depositing opening for a user to pour the product into the container body, and the depositing opening can be opened and/or closed by a container cover of the container.

In some embodiments, the apparatus further can include a housing. The housing can include the wall and an interior space. The discharging end of the ramp can be located within the interior space. The sensor can be configured to measure the airborne particles within the interior space. In several embodiments, at least a portion of the wall can include a background color that is in clear contrast with the color(s) of the product so that the sensor can detect the airborne particles against the background color of the at least the portion of the wall to determine the dustiness of the product. Further, the background color being in clear contrast with the color of the product would be helpful for a user to easily observe the dustiness of the product and/or determine whether the housing needs cleaning before or after an experiment. The contrast between the background color and the color of the product can include a contrast of hue, a light-dark contrast, a cold-warm contrast, a complementary contrast, a simultaneous contrast, a contrast of saturation, and/or a contrast of extension. For example, the background color can be a dark color (e.g., black, navy blue, or mahogany, etc.) that is in clear contrast in brightness with the light color(s) of a clay cat litter to be tested (e.g., white, beige, light gray, etc.). The background color further can be one of yellow, red, or blue that in clear contrast in hue with the color of the product that is a different one of yellow, red, or blue.

In certain embodiments, in addition to the wall and the interior space, the housing can include one or more additional walls, a bottom plate, and/or a top cover. At least one of the one or more additional walls and/or the top cover of the housing can be transparent so that a user can observe the experiments on the product(s) from outside of the housing. In many embodiments, the apparatus also can include a tray for receiving the product after the product falls from the ramp. The tray can be placed on the bottom plate of the apparatus, if any, or directly on a surface supporting the apparatus (e.g., the floor or a tabletop). In some embodiments, the one or more additional walls can include a tray access opening or a door for accessing the tray for replacement or cleaning between experiments. In certain embodiments, the apparatus also can include a vacuum and/or a fan configured to remove any remaining particles floating in the air after the apparatus is used for an experiment and/or before the apparatus is used for another experiment.

In a number of embodiments, the components of the apparatus each can have any suitable dimensions, shapes, materials, heights, and/or arrangements. For example, the housing of the apparatus can be a rectangular box with 24 inches (") in length (L), 24" in width (W), and 36" in height (H). The housing can include a 24" (W)×24" (H) front wall with a tray access opening of 12" (W)×24" (H) at the bottom for accessing a tray. The receiving end of the ramp can be approximately 10.0", 12.5", 14.3" or 15.5" higher than the discharging end and/or the dam. The dam of the ramp can include an aperture of any suitable height (e.g., 0.50", 0.63", 0.69", 0.75", 0.88", 1.00", etc.).

The container can have a maximum capacity (e.g., 7 pounds (lbs.), 13 lbs., 250 cubic inch ($in^3$), 384 $in^3$, 1,152 $in^3$, etc.) for a product (e.g., a clay cat litter or a sodium bentonite clay litter). The container can be an 8" (L)×6" (W)×8" (H) rectangular box. The container further can include markings indicating volumes of a product and/or a scale for showing the weight of the product inside the container. For example, the container can have a volume of 384 $in^3$ (0.22 cubic feet ($ft^3$)) and can include markings inside the container body indicating the volume, the height, the distance from the top edge of the container body, etc. of the product inside the container body. When 10 lbs. of a 60 lbs./$ft^3$ cat litter is loaded in the container, the top level the product can reach a 3.5" marking from the top edge of the container.

Various embodiments can include another apparatus for measuring dustiness of a product. The apparatus can include identical or similar components as the apparatus described above. Here, the apparatus can include a wall, a container, a ramp, and a sensor. The container can be located at a first side of the wall. The container can include a container body configured to hold the product, and the container body can include a discharging opening. The container further can include a door configured to close or open the discharging opening of the container body. In some embodiments, the container can be mounted on the wall or elevated by another structure (e.g., a stand or one or more legs).

The ramp of the apparatus can include a receiving end and a discharging end. The discharging end can be located at a second side of the wall that is opposite the first side of the wall. The ramp can be configured to receive, at the receiving end, the product discharged from the container body when the door of the container is open. The ramp further can be configured to allow gravity to move the product from the receiving end toward the discharging end to exit the ramp. Additionally, the ramp can be configured so that the door, when open, lies on a surface of the ramp. In some embodiments, the ramp further can include an angle of inclination relative to a support surface. The angle of inclination relative to the support surface can be in a range of approximately 50° to approximately 60° (e.g., 47° to 63°, 51° to 58°, etc.). In a number of embodiments, the ramp further can include a dam located at or near the discharging end and configured to control a mass flow rate of the product exiting the ramp.

The sensor of the apparatus can be configured to measure airborne particles generated by the product exiting the ramp and freely falling onto a support surface for determining the dustiness of the product. The discharging end of the ramp can be located between the sensor and the wall. The sensor can be identical or similar to the sensor described above. For example, the sensor can include a particle counter that uses laser to count the concentration of particles in the air. The sensor can detect particles of different sizes (e.g., 0.3 µm, 2.5 µm, and 10 µm) at the same time. The sensor further can include an adjustable height, a configurable sampling frequency, and/or adaptive particle sizes, etc. The apparatus can further include a sensor holder configured to adjust the height of the sensor. For example, the sensor holder can include a rail with multiple height levels and a platform configured to support the sensor at one of the multiple height levels (e.g., 17 evenly or unevenly spaced height levels from 13.7" to 33.7", 6 evenly or unevenly spaced height levels from 24.5" to 32.5", etc.).

In many embodiments, the apparatus additionally can include a housing. The housing can be identical or similar to the housing described above. The housing can include the wall and an interior space. The discharging end of the ramp can be located within the interior space. The sensor can be configured to measure the airborne particles within the interior space. In a number of embodiments, at least a portion of the interior surface can be of a background color in clear contrast with a color of the product. The sensor can detect the airborne particles against the background color of the interior space to determine the dustiness of the product.

Various embodiments include a method for measuring dustiness of a product in one or more experiments. The method can measure the dustiness of the product in one or more acts or steps in an experiment. The one or more acts can include an act of providing the product onto a ramp. The one or more acts further can include allowing gravity to move the product down the ramp, toward a discharging end of the ramp, and to exit the ramp through a dam at the discharging end of the ramp. In a number of embodiments, the dam of the ramp can be configured to control a mass flow rate of the product exiting the ramp. In many embodiments, the one or more acts of the method additionally can include measuring, by a sensor, airborne particles to determine the dustiness of the product. The airborne particles can be generated by the product exiting the ramp and freely falling onto a support surface (e.g., a floor, a bottom plate, or a bottom of a tray). In various embodiments, the ramp can be identical or similar to any of the aforementioned ramps, and the sensor can be identical or similar to any of the sensors described above.

In a number of embodiments, the act of providing the product onto the ramp further can include: (a) using a container to hold the product; and (b) opening a door of the container to discharge the product from the container onto the ramp. The container can be identical or similar to any of the containers of the aforementioned apparatuses. The act of allowing gravity to move the product further can include allowing gravity to move the product from the door of the container onto the ramp, down the ramp, toward the discharging end of the ramp, and to exit the ramp through the dam at the discharging end of the ramp. The ramp can include an angle of inclination relative to the support surface in a range of approximately 50 degrees to approximately 60 degrees. In some embodiments, the door of the container and the ramp can be configured so that the door, when open, lies on the ramp. In certain embodiments, the door, when open, can lay flat on the ramp.

In some embodiments, measuring the airborne particles can include recording one or more sets of readings by the sensor. For example, the sensor can be configured to take 5 readings from each of the 4 particle size channels of the sensor (e.g., 1.0 µm, 3.0 µm, 10.0 µm, and 15.0 µm). The first reading of each particle size channel can be taken 20 seconds after the product is provided onto the ramp, and the remaining readings can be taken every 20 seconds afterwards. That is, recording the readings can include recording 4 sets of 5 readings by the sensor, which includes 20 readings per experiment. In another example, recording the readings can include recording 3 sets (e.g., 1.0 µm, 2.5 µm, and 10.0 µm) of 4 readings by the sensor taken at the 20-second, 50-second, 80-second, and 100-second points of time after the product is provided onto the ramp. In several embodiments, recording the one or more sets of readings by the sensor can be performed manually, by the sensor with a non-transitory storage medium, or by a computer electronically connected to the sensor. In many embodiments, the method can perform multiple experiments on each product (e.g., repeating one or more of the aforementioned one or more acts) to determine the dustiness of the product based on the average value(s) of the one or more respective sets of readings.

In a number of embodiments, the method further can include providing a housing having an interior space. The housing can be identical or similar to any of the housings of the aforementioned apparatuses. In similar or different embodiments, the discharging end of the ramp can be located within the interior space, and measuring, by the sensor, the airborne particles further can include measuring, by the sensor, the airborne particles within the interior space to determine the dustiness of the product. In several embodiments, at least a portion of a wall can include a background color that is in clear contrast (e.g., a high contrast of hue, brightness, saturation, etc.) with a color of the product so that the sensor can detect the airborne particles against the at least the portion of the wall having the background color. In embodiments where at least a portion of a housing includes a background color that is in clear contrast to the color of the product, measuring, by the sensor, the airborne particles further can include measuring, by the sensor, the airborne particles against the background color of the at least the portion of the housing to determine the dustiness of the product.

In many embodiments, the method additionally can include one or more preparatory acts before providing the product onto the ramp and before measuring the airborne particles. The one or more preparatory acts can include adjusting a height of the sensor. Adjusting the height of the sensor further can include: (a) providing a platform configured to support the sensor; and (b) coupling the platform supporting the sensor to one of multiple height levels of a rail so that the sensor reaches the height, as adjusted. In certain embodiments, adjusting the height of the sensor further can include placing the sensor onto the platform so that the probe of the sensor is level with an edge of the platform and faces away from the rail. The platform and/or the rail can be identical or similar to any of the platforms and/or rail of the aforementioned apparatuses.

In embodiments where the sensor includes a battery, the one or more preparatory acts further can include charging the battery and/or making sure the battery of the sensor is sufficiently charged for taking multiple readings for the experiment(s). The one or more preparatory acts additionally can include loading the container with the product (e.g., approximately 10 lbs. of a cat litter). Loading the container with the product further can include before pouring the product into the container, closing the door of the container by latching the door securely. The one or more preparatory acts also can include cleaning the wall, the housing, the interior space, and/or the ramp. Cleaning can include wiping off and/or vacuuming dust from the wall, the housing, the interior space, and/or the ramp. In several embodiments, cleaning the wall, the housing, the interior space, and/or the ramp can be performed before and/or after measuring the airborne particles.

Various embodiments further can include another apparatus for measuring dustiness of a product. The apparatus can be similar or identical to any of the apparatuses discussed above. The apparatus also can include one or more components that are similar or identical to any of the components of the apparatuses discussed above. In many embodiments, the apparatus can include a ramp and a sensor. The ramp can include a dam configured to control a mass flow rate of the product moved by gravity down the ramp. In some embodiments, the ramp further can include an angle of inclination relative to a support surface in a range of approximately 50 degrees to approximately 60 degrees.

In a number of embodiments, the sensor can be configured to measure airborne particles generated by the product exiting the ramp and freely falling onto a support surface to determine the dustiness of the product. The sensor can include an adjustable height. In some embodiments, the apparatus additionally can include a sensor holder. The sensor holder can include a rail with multiple height levels, and a platform configured to support the sensor at one of the multiple height levels.

In several embodiments, the apparatus further can include a housing with an interior space. Some or all of the components of the apparatus can be located (entirely or partially) inside the interior space of the housing. For example, the discharging end of the ramp can be located in the interior space. The sensor (or part of the sensor) can be located inside the interior space and be configured to measure the airborne particles within the interior space. In some embodiments, the apparatus further can include a wall. At least a portion of the wall can include a background color that is in clear contrast with a color of the product, and the sensor can be configured to detect the airborne particles against the background color of the at least the portion of the wall to determine the dustiness of the product.

In many embodiments, the apparatus further can include a container. The container can include a container body configured to hold the product, and a door configured to close or open the container body. In some embodiments, when the door is open, the container body can discharge the product to the ramp. In certain embodiments, the door and the ramp can be configured so that the door, when open, lies on the ramp.

Various embodiments additionally include another apparatus for measuring dustiness of a product. The apparatus can be similar or identical to any of the apparatuses discussed above. The apparatus also can include one or more components that are similar or identical to any of the components of the apparatuses discussed above. In many embodiments, the apparatus can include a container, a ramp, and a sensor. The container can include a container body configured to hold the product, and a door configured to close or open the container body.

In a number of embodiments, the ramp can be configured to: (a) receive the product discharged from the container body when the door is open; and (b) allow gravity to move the product down the ramp. In some embodiments, the ramp further can be configured so that the door of the container, when open, lies on a surface of the ramp. The ramp further can include an angle of inclination relative to the support surface in a range of approximately 50 degrees to approximately 60 degrees. The ramp further can include a dam configured to control a mass flow rate of the product that is moved down the ramp by gravity.

In many embodiments, the sensor can be configured to measure airborne particles generated by the product exiting the ramp and freely falling onto a support surface for determining the dustiness of the product. In several embodiments, the apparatus further can include a sensor holder for the sensor. The sensor holder can include a rail and a platform. The rail can include multiple height levels, and the platform can be configured to support the sensor at one of the multiple height levels so that the sensor can have an adjustable height.

In a number of embodiments, the apparatus further can include a housing. The housing can include an interior space. The discharging end of the ramp can be located within the interior space. The sensor also can be configured to measure the airborne particles within the interior space. In some embodiments, the apparatus further can include a wall. At least a portion of the wall can be of a background color that is in clear contrast with a color of the product. The sensor can be configured to detect the airborne particles against the background color of the at least the portion of the wall to determine the dustiness of the product.

Various embodiments further include another method for measuring dustiness of a product. The method can be similar or identical to any of the methods discussed above. The method also can include one or more acts that are similar or identical to any of the acts of the methods discussed above. In many embodiments, the method can include providing the product onto a ramp. The ramp can include an angle of inclination relative to the support surface in a range of approximately 50 degrees to approximately 60 degrees. The act of providing the product onto the ramp can include: (a) using a container to hold the product, and (b) opening a door of the container to discharge the product from the container onto the ramp. The door and the ramp can be configured so that the door, when open, lies on the ramp.

In a number of embodiments, the method further can include allowing gravity to move the product down the ramp through a dam. The dam can be configured to control a mass flow rate of the product moved down the ramp by gravity. The act of allowing gravity to move the product down the ramp can include allowing gravity to move the product from the door of the container onto the ramp, down the ramp through the dam, and to exit the ramp.

In many embodiments, the method further can include measuring, by a sensor, airborne particles to determine the dustiness of the product. The airborne particles can be generated by the product exiting the ramp and freely falling onto a support surface. In some embodiments, the method further can include providing a housing having an interior space. The act of measuring, by the sensor, the airborne particles further can include measuring, by the sensor, the airborne particles within the interior space to determine the dustiness of the product.

In several embodiments, the method further can include, before providing the product onto the ramp and before measuring the airborne particles, adjusting a height of the sensor. The act of adjusting the height of the sensor can include providing a platform configured to support the sensor and coupling the platform supporting the sensor to one of multiple height levels of a rail so that the sensor reaches the height. In a number of embodiments, at least a portion of a wall can include a background color so that the sensor can detect the airborne particles against the at least the portion of the wall having the background color. The act of measuring, by the sensor, the airborne particles further can include measuring, by the sensor, the airborne particles against the background color of the at least the portion of the wall to determine the dustiness of the product.

Figure 1:
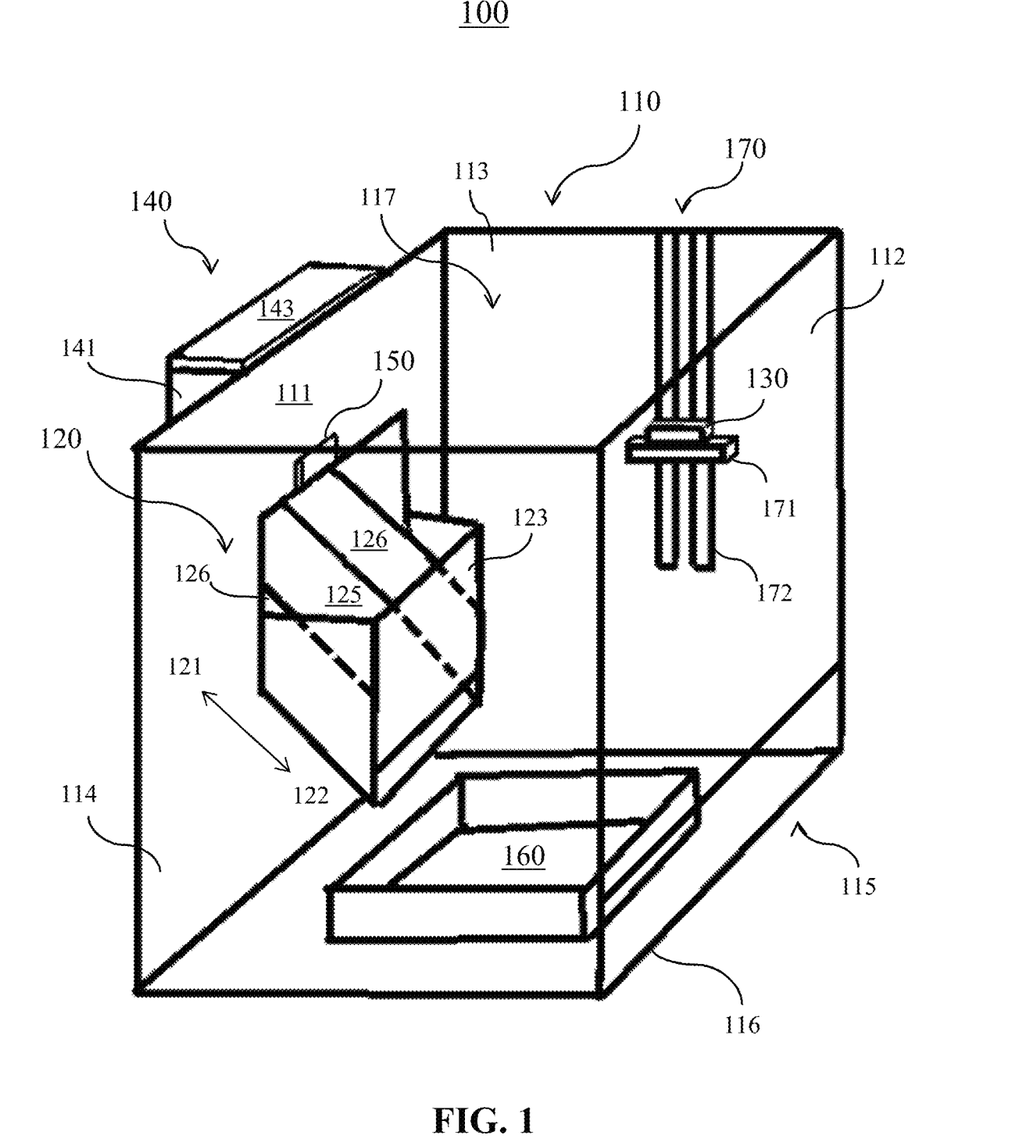
FIG. 1 illustrates a front, top, left perspective, transparent view of an apparatus for measuring dustiness of a product, according to an embodiment.
Figure 2:
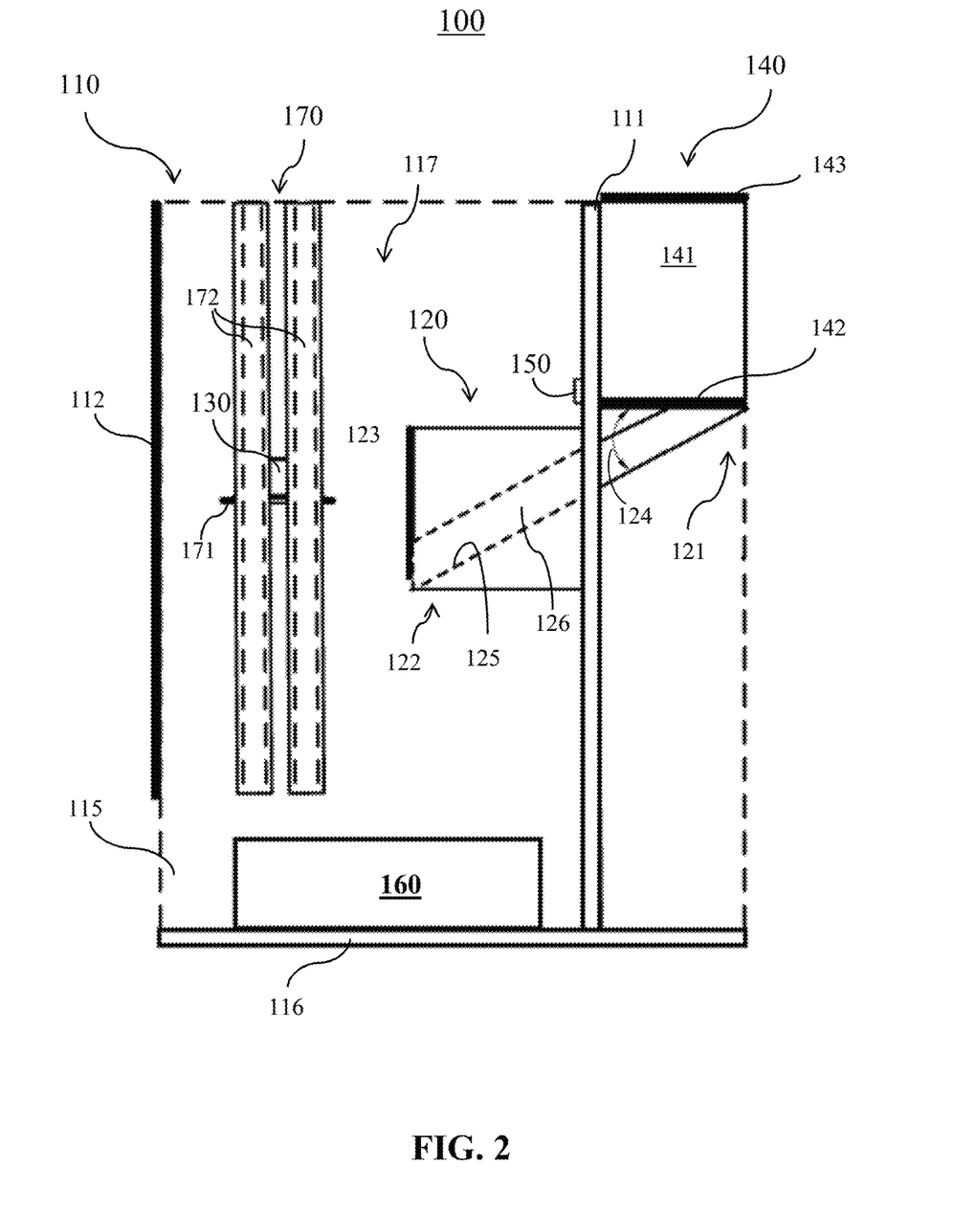
FIG. 2 illustrates a right side, transparent view of the apparatus of FIG. 1, according to an embodiment.

Turning to the drawings, FIGS. 1-2 illustrate an apparatus (100) for measuring dustiness of a product, according to an embodiment. The product can be any dust generating products, such as cat litter. The apparatus (100) can include a housing (110), a ramp (120), a sensor (130), a container (140), a latch (150), and a tray (160). The housing (110) can include a wall (111), a front wall (112), a right sidewall (113), a left sidewall (114), a tray access opening (115), a bottom panel (116), and an interior space (117). The interior space (117) can be formed by the wall (111), the front wall (112), the right sidewall (113), the left sidewall (114), and the bottom panel (116). The sensor (130), at least a part of the ramp (120), the latch (150), and/or the tray (160) can be located in the interior space (117). The front wall (112), the right sidewall (113), and/or the left sidewall (114) can be transparent so that a user can observe the experiments from outside the housing (110).

The ramp (120) can include a receiving end (121), a discharging end (122) opposite the receiving end (121), and a dam (123). The receiving end (121) can be located outside the interior space (117) at a first side of the wall (111) of the housing (110) while the discharging end (122) is located inside the interior space (117) at a second side of the wall (111). The discharging end (122) of the ramp (120) further can be located between the sensor (130) and the wall (111). The dam (123) also can be located inside the interior space (117). The ramp (120) additionally can include an angle of inclination (124) relative to a support surface (e.g., the bottom panel (116), a floor supporting the housing (110), or a virtual horizontal line). The angle of inclination (124) can be any suitable angle (e.g., 53°, 55°, 58°, 62°, or an angle approximately between 50 and 60 degrees, etc.) for the product to move down the ramp (120) by gravity. In several embodiments, the ramp (120) further can include a surface (125) and sidewalls (126).

Further, the dam (123) of the ramp (120) can be configured to control a mass flow rate of the product exiting the ramp (120). For example, when the dam (123) is 7.75" (H)×8.00" (W) and includes a 0.69" (H)×8.00" (W) aperture, the mass flow rate of a sodium bentonite clay litter can be approximately 1 lb. per second. In another example, the mass flow rate can be approximately 1.5 lbs. per second per linear foot of the ramp (120). Moreover, the lower edge of the aperture of the dam (123) can have a suitable height (e.g., 10.5", 12.2", 13.8", etc.) from the top or bottom surface of the bottom panel (116).

Still referring to FIGS. 1-2, the sensor (130) can be configured to measure the airborne particles within the interior space (117) after the airborne particles are generated by the product exiting the ramp (120) and freely falling onto the support surface (e.g., the top surface of the bottom panel (116) or the bottom of the tray (160)) to determine the dustiness of the product. In some embodiments, the wall (111) can include a background color (e.g., black or dark green) that is in clear contrast with the color(s) of the product (e.g., beige or light gray) so that the sensor (130) can measure the airborne particles against the background color of the wall (111) to determine the dustiness of the product. The sensor (130) can be identical or similar to any of the sensors described above. For example, the sensor (130) can include a particle counter with 3 channels configured to simultaneously measure airborne particles of 3 different particle sizes (e.g., 0.3 μm, 2.5 μm, and 10.0 μm). The sensor further can include one or more of the above-mentioned user-configurable options (e.g., a number of particle size channels, a sampling frequency, etc.) and/or additional components (e.g., a battery, a probe, a temperature sensor, etc.).

As shown in FIGS. 1-2, the sensor (130) can include a height (e.g., 26.2", 27.6", 30.1", etc.) adjustable by the sensor holder (170) of the apparatus (100). The sensor holder (170) can include a platform (171) configured to support the sensor (130) and movably mounted on rails (172) at one of multiple height levels of the rails (172). In some embodiments, the platform (171) can include one or more mounting brackets (not shown) configured to be detachably coupled to one or more slots of the rails (172). The multiple height levels of the rails (172) can be evenly or unevenly spaced apart.

The container (140) can be located at the first side of the wall (111) and can include a container body (141) configured to hold the product. The container body (141) can include a depositing opening that can be opened or closed by the container cover (143) and a discharge opening that can be closed or opened by the door (142). The door (142) can be hinged at the rear wall of the container body (141) and opened or closed by the latch (150). When the door (142) is closed, the user can open the container cover (143) to load the product into the container body (141) through the depositing opening. When the container (140) is loaded with the product, a user can activate the latch by pulling (or pushing, depending on the configuration) the latch (150) to allow the door (142) to open (via gravity) and discharge the product through the discharge opening to the receiving end (121) of the ramp (120). (In some embodiments, the latch (150) is located outside of the interior space (117) and on the other side of the wall (111) compared to what is illustrated in FIGS. 1-2.) As shown in FIGS. 1-2, the discharging end (121) of the ramp (120) and the door (142) can meet at the hinged portion of the door (142) so that the door (142), when open, can swing open and lay flat on the surface (125) of the ramp (120).

When the apparatus (100) in FIGS. 1-2 is used to perform an experiment to measure dustiness of a product, a user can first load a predetermined quantity (e.g., 5 lbs., 10 lbs., etc.) of the product into the container (140). The user further can pull the latch (150) so that the door (142) swings open and lies on the surface (125) of the ramp (120). Then the product in the container (140) is released by gravity through the dispensing opening of the container body (141) onto the receiving end (121) of the ramp (120). With the angle of inclination (124), gravity would continue to move the product from the receiving end (121), down the ramp (120), toward the discharging end (122), and to exit the ramp (120) through the aperture of the dam (123). The product exiting the ramp (120) can fall freely into the tray (160) and generate dust, while falling and/or upon impact with the tray (160), in the interior space (117).

The sensor (130) can start to detect and/or record the concentration of airborne particles of certain particle size(s) (e.g., 0.3 µm, 2.5 µm, and 10 µm) in the interior space (117) at one or more predetermined points of time after the door (142) is open (e.g., 0 seconds, 15 seconds, 20 seconds, 30 seconds, 40 seconds, 105 seconds, etc.). The sensor (130) can be configured to start the measurement and/or recording automatically or manually (via a remote control or by the user pressing a start button on the sensor). The readings of the sensor (130) can be recorded by the user, the sensor, or a computer (not shown) electronically communicable with the sensor (130).

After the readings by the sensor (130) are recorded, the user can repeat the experiment on the product once or multiple times, if desired, so that any outlier(s) can be identified, and the result of the experiment can be more accurate. Further, when multiple experiments are to be performed, either on the same product or different products, the user can clean the tray (160) and/or wipe off or vacuum dust from the wall (111), the front wall (112), the right sidewall (113), the left sidewall (114), the interior space (117), and/or the ramp (120) before or after each experiment.

Figure 3:
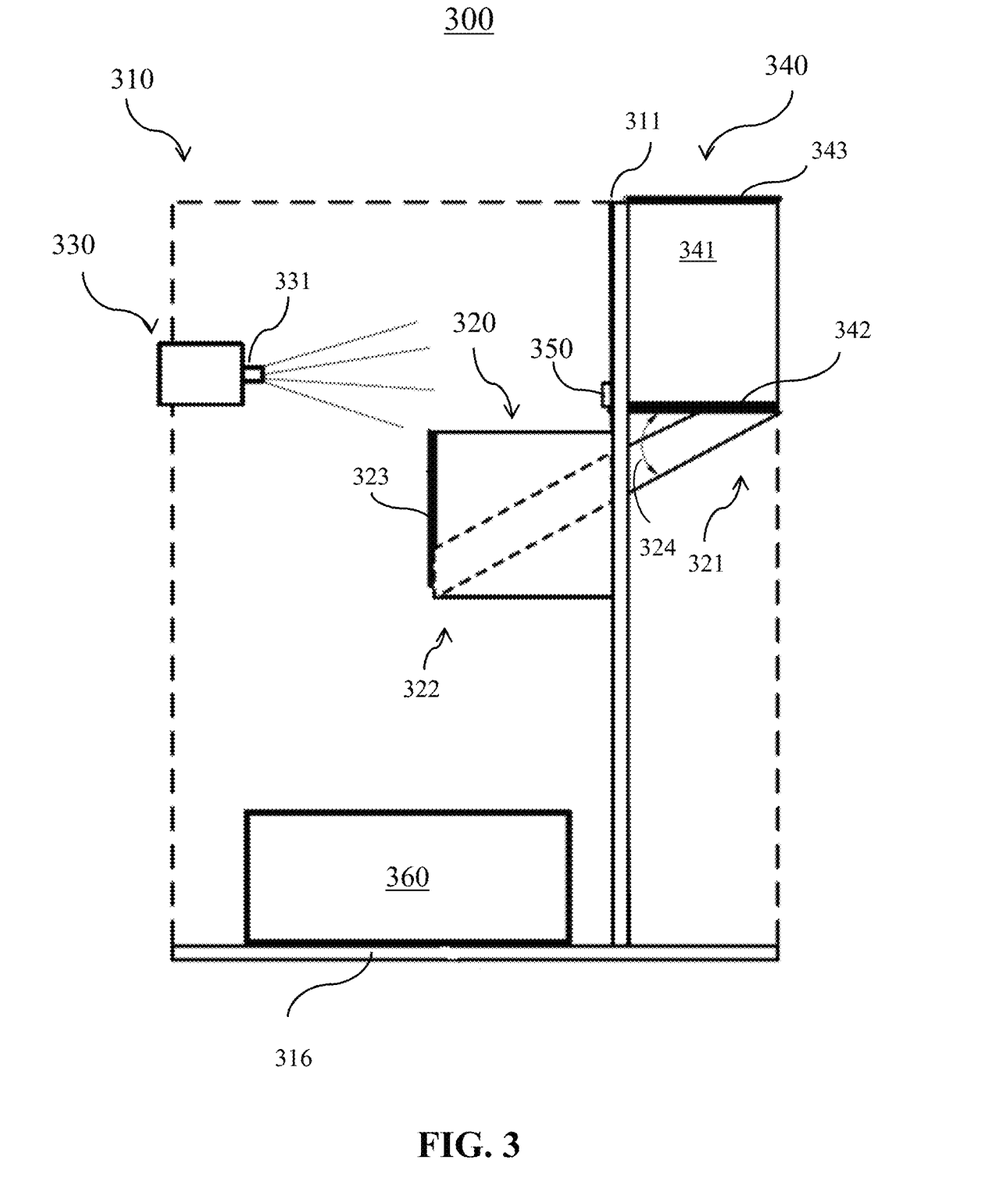
FIG. 3 illustrates a right side, transparent view of an apparatus for measuring dustiness of a product, according to a different embodiment.

Turning ahead in the drawings, FIG. 3 illustrates an apparatus (300) for measuring dustiness of a product, according to an embodiment. The apparatus (300) can be identical or similar to any of the apparatuses described above (e.g., 100 (FIGS. 1-2)). The apparatus (300) can include a housing (310), a ramp (320), a sensor (330), a container (340), a latch (350), and a tray (360). The housing (310) can be identical or similar to any of the housings described above (e.g., 110 (FIGS. 1-2)). The ramp (320) can be identical or similar to any of the ramps described above (e.g., 120 (FIGS. 1-2)). The sensor (330) can be identical or similar to any of the sensors described above (e.g., 130 (FIGS. 1-2)). The container (340) can be identical or similar to any of the containers described above (e.g., 140 (FIGS. 1-2)). The latch (350) can be identical or similar to any of the latches described above (e.g., 150 (FIGS. 1-2)). The tray (360) can be identical or similar to any of the trays described above (e.g., 160 (FIGS. 1-2)).

As shown in FIG. 3, the housing (310) can include a wall (311) and a bottom panel (316). The ramp (320) can include a receiving end (321), a discharging end (322), a dam (323), and an angle of inclination (324) relative to a support surface. The container (340) can include a container body (341), a door (342), and a container cover (343). The ramp (320) can be configured to receive, at the receiving end (321), the product released from the container (340) and allow gravity to move the product from the receiving end (321) toward the discharging end (322) and exit the ramp (320) through the dam (323). The receiving end (321) can be located at a first side of the wall (311), and the discharging end (322) can be located at a second side of the wall (311) that is opposite the first side. The dam (323) can be configured to control a mass flow rate of the product exiting the ramp (320). The angle of inclination (324) can be any suitable angle, such as an angle in a range of approximately 50 degrees to approximately 60 degrees.

Still referring to FIG. 3, the sensor (330) can be configured to measure airborne particles generated by the product exiting the ramp (320) and freely falling onto a support surface (e.g., the bottom of the tray (360)) to determine the dustiness of the product. The sensor (330) can include a probe (331) generally facing towards the ramp (320) and/or the wall (311). The container (340) can be located at the first side of the wall (311) and include a container body (341), a door (342), and a container cover (343). The container body (341) can be configured to hold the product when the door (342) is closed and include a receiving opening and a discharging opening. The door (342) can be open or closed by the latch (350). The receiving end (321) of the ramp (320) can be located below the discharging opening of the container body (341) to receive the product. The discharging end (322) of the ramp (320) can be located between the sensor (330) and the wall (311), while the sensor (330) can have a height greater, less, or similar to a height of the discharging end (322) of the ramp (320). The door (342), when open, can lie flat on the ramp (320). In a few embodiments, the housing (310) further can include one or more additional walls and/or a top cover.

Figure 4:
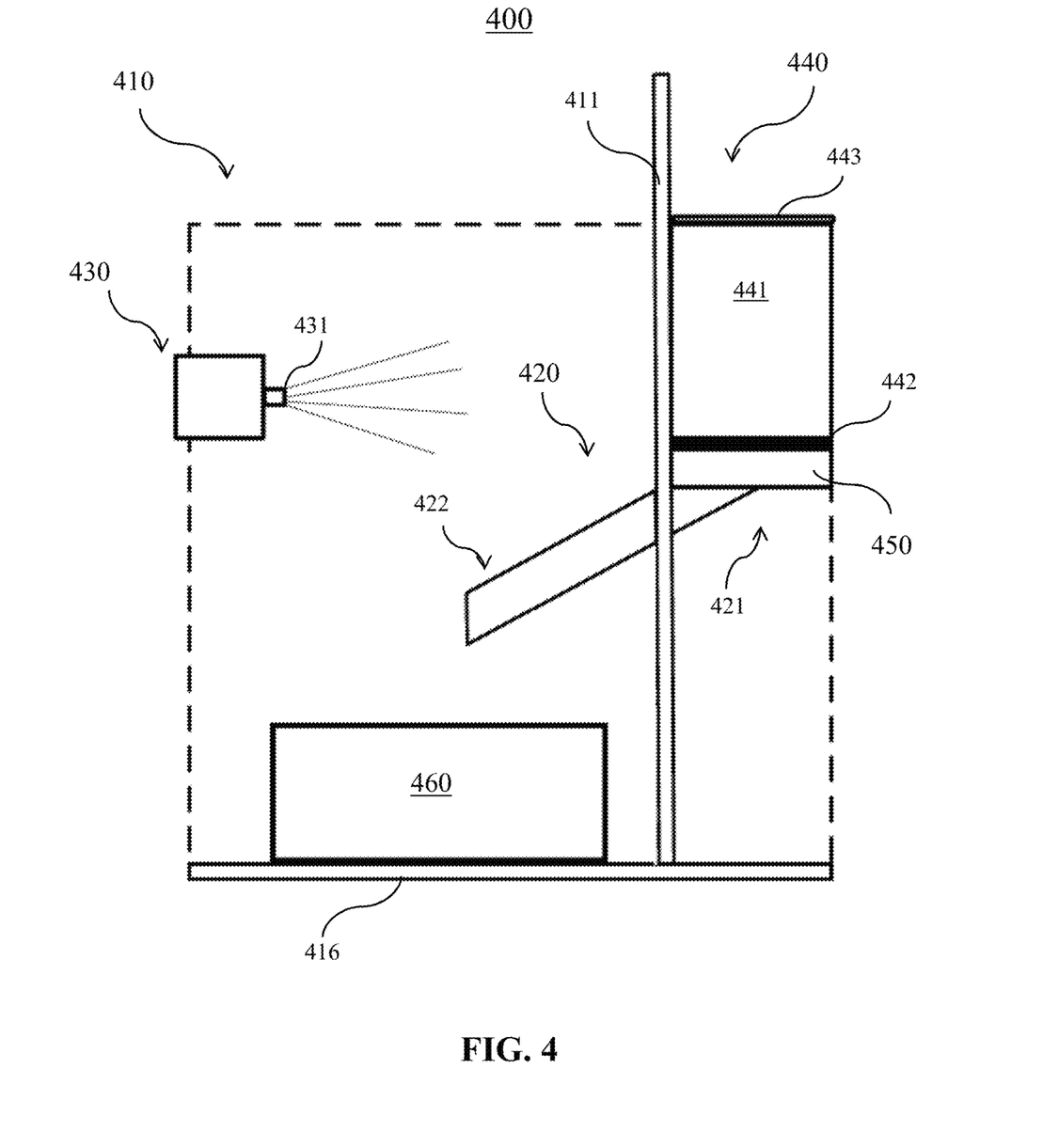
FIG. 4 illustrates a right side, transparent view of an apparatus for measuring dustiness of a product, according to another embodiment.
Figure 5:
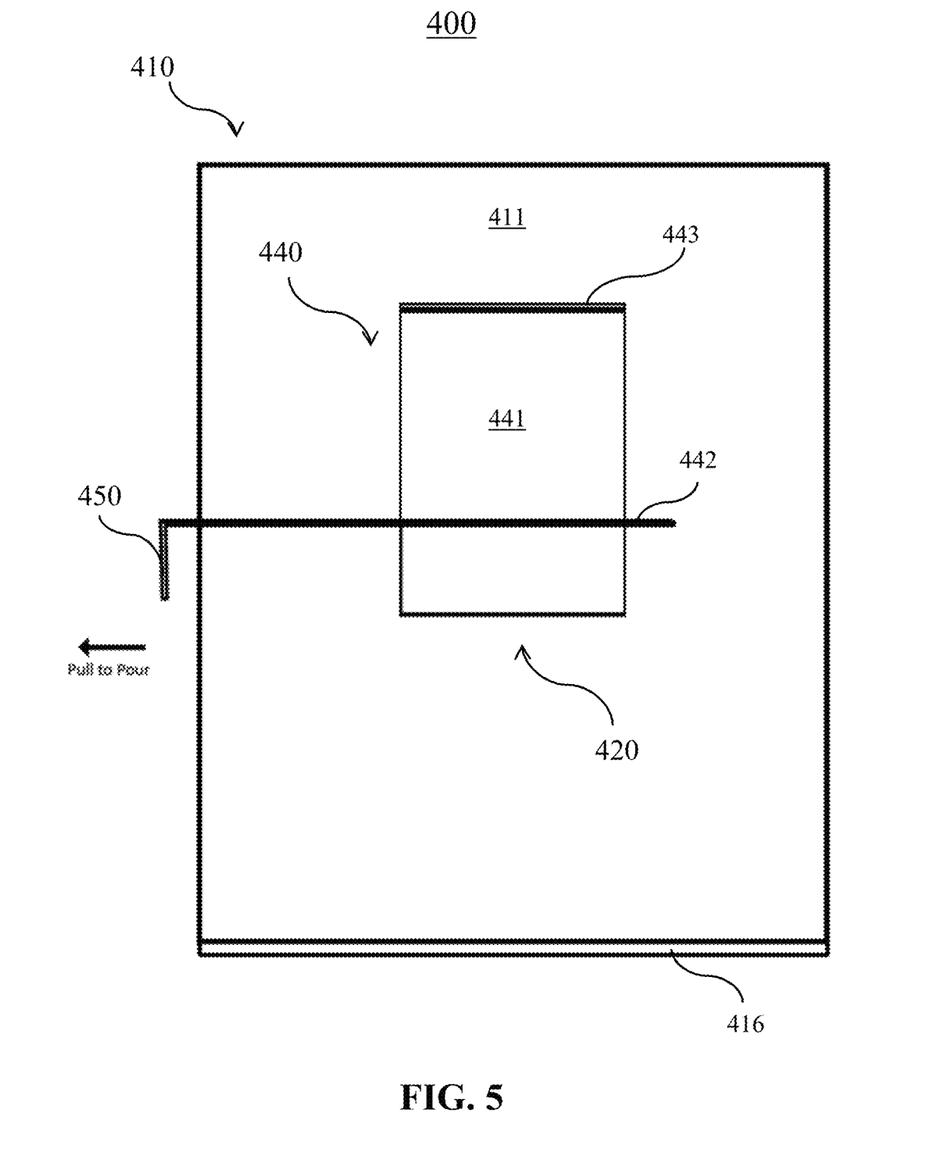
FIG. 5 illustrates a back view of the apparatus of FIG. 4, according to an embodiment.

Turning ahead in the drawings, FIGS. 4-5 illustrate an apparatus (400) for measuring dustiness of a product, according to an embodiment. The apparatus (400) can be identical or similar to any of the apparatuses described above (e.g., 100 (FIG. 1-2) or 300 (FIG. 3)). The apparatus (400) can include a housing (410), a ramp (420), a sensor (430), a container (440), a pull bar (450), and a tray (460). The housing (410) can be identical or similar to any of the housings described above (e.g., 110 (FIG. 1-2) or 310 (FIG. 3)). The ramp (420) can be identical or similar to any of the ramps described above (e.g., 120 (FIG. 1-2) or 320 (FIG. 3)). The sensor (430) can be identical or similar to any of the sensors described above (e.g., 130 (FIG. 1-2) or 330 (FIG. 3)). The container (440) can be identical or similar to any of the containers described above (e.g., 140 (FIG. 1-2) or 340 (FIG. 3)). The tray (460) can be identical or similar to any of the trays described above (e.g., 160 (FIG. 1-2) or 360 (FIG. 3)).

The housing (410) can include a wall (411) and a bottom panel (416). The ramp (420) can include a receiving end (421) and a discharging end (422). The container (440) can include a container body (441), a door (442), and a container cover (443). The ramp (420) can be configured to receive, at the receiving end (421), the product released from the container (440) and allow gravity to move the product from the receiving end (421) toward the discharging end (422) to exit the ramp (420). The receiving end (421) can be located at a first side of the wall (411), and the discharging end (422) can be located at a second side of the wall (411) that is opposite the first side.

Still referring to FIGS. 4-5, the sensor (430) can be configured to measure airborne particles generated by the product exiting the ramp (420) and freely falling into the tray (460) to determine the dustiness of the product. The sensor (430) can include a probe (431) generally facing towards the ramp (420) and/or the wall (411). The container (440) can be located at the first side of the wall (311) and can include a container body (441), a door (442), and a container cover (443). The container body (441) can be configured to hold the product when the door (442) is closed and can include a receiving opening and a discharging opening. The door (442) can be opened (via gravity) or closed by respectively pulling the pull bar (450) away from the wall (411) or pushing the pull bar (450) towards the wall (411). The receiving end (421) of the ramp (420) can be located below the discharging opening of the container body (441) to receive the product released from the container body (441), when the door (442) is open. The discharging end (422) of the ramp (420) can be located between the sensor (430) and the wall (411).

Figure 6:
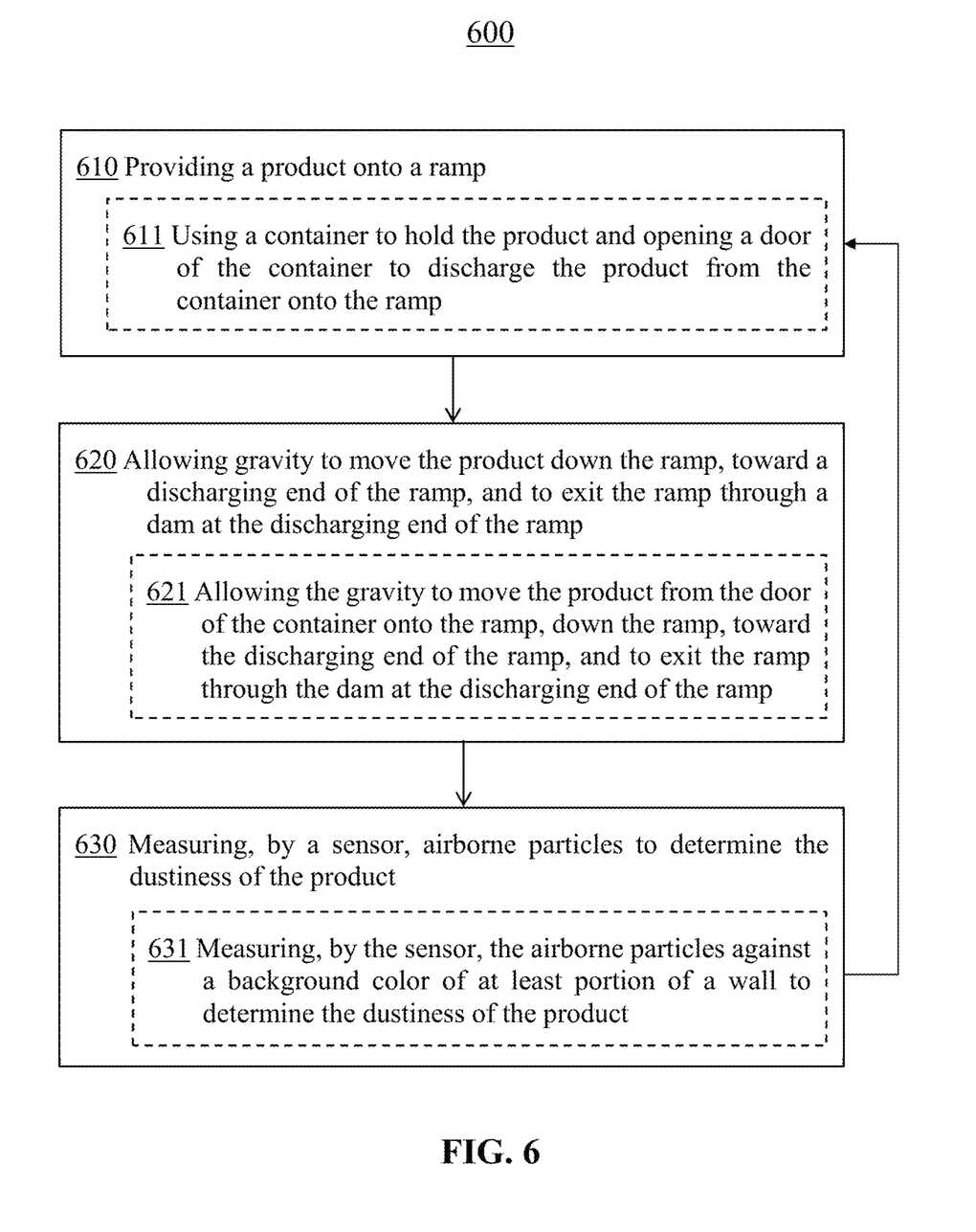
FIG. 6 illustrates a flow chart of a method for measuring dustiness of a product, according to an embodiment.

Turning ahead in the drawings, FIG. 6 illustrates a method (600) for measuring dustiness of a product (e.g., a clay cat litter) in an experiment, according to an embodiment. The method (600) can include a block 610 for providing the product onto a ramp (e.g., 120 (FIGS. 1-2), 320 (FIG. 3), or 420 (FIGS. 4-5)). Block 610 can include a block 611 for using a container (e.g., 140 (FIGS. 1-2), 340 (FIG. 3), or 440 (FIGS. 4-5)) to hold the product and opening a door (e.g., 142 (FIGS. 1-2), 342 (FIG. 3), or 442 (FIGS. 4-5)) of the container to discharge the product from the container onto the ramp.

In many embodiments, the method (600) further can include a block 620 for allowing gravity to move the product down the ramp (e.g., 120 (FIGS. 1-2), 320 (FIG. 3), or 420 (FIGS. 4-5)), toward a discharging end (e.g., 122 (FIGS. 1-2), 322 (FIG. 3), or 422 (FIGS. 4-5)) of the ramp, and to exit the ramp through a dam (e.g., 123 (FIGS. 1-2), 323 (FIG. 3), or 423 (FIGS. 4-5)) at the discharging end of the ramp. Block 620 can include a block 621 for allowing gravity to move the product from the door (e.g., 142 (FIGS. 1-2), 342 (FIG. 3), or 442 (FIGS. 4-5)) of the container onto the ramp, down the ramp, toward the discharging end of the ramp, and to exit the ramp through the dam at the discharging end of the ramp. In some embodiments, the ramp further can include a receiving end (e.g., 121 (FIGS. 1-2), 321 (FIG. 3), or 421 (FIGS. 4-5)) for receiving the product from the container. The ramp also can include an angle of inclination (e.g., 124 (FIG. 2) or 324 (FIG. 3)) approximately between 50 and 60 degrees, relative to a support surface (e.g., a floor or a tabletop). The dam can be configured to control a mass flow rate of the product exiting the ramp. In certain embodiments, the door and the ramp can be configured so that the door of the container, when open, lies flat on a surface (e.g., 125 (FIGS. 1-2)) of the ramp.

In a number of embodiments, the method (600) additionally can include a block 630 for measuring, by a sensor (e.g., 130 (FIGS. 1-2), 230 (FIG. 3), or 430 (FIGS. 4-5)), airborne particles to determine the dustiness of the product. The airborne particles can be generated by the product exiting the ramp and freely falling onto a support surface, such as a bottom of the tray (e.g., 160 (FIGS. 1-2), 360 (FIG. 3), or 460 (FIGS. 4-5)). Block 630 can include a block 631 for measuring, by the sensor, the airborne particles against a background color (e.g., black, dark blue, etc.) of at least portion of a wall (e.g., 111 (FIGS. 1-2), 311 (FIG. 3), or 411 (FIGS. 4-5)) to determine the dustiness of the product. The background color can be a color in clear contrast (e.g., a dark-light contrast, warm-cold contrast, contrast in hue, etc.) with a color of the product. After measuring the airborne particles in block 630, the method (600) can perform one or more additional experiments by repeating the blocks 610, 620, and/or 630.

In some embodiments, the method (600) further can include before providing the product onto the ramp in block 610 and before measuring the airborne particles in block 630, adjusting a height of the sensor (e.g., 130 (FIGS. 1-2), 230 (FIG. 3), or 430 (FIGS. 4-5)) by (a) providing a platform (e.g., 171 (FIGS. 1-2)) configured to support the sensor, and (b) coupling the platform supporting the sensor to one of multiple height levels of a rail (e.g., 172 (FIGS. 1-2)) so that the sensor reaches the height, as adjusted. In several embodiments, the method (600) also can include providing a housing (e.g., 110 (FIGS. 1-2), 310 (FIG. 3), or 410 (FIGS. 4-5)) with an interior space (e.g., 117 (FIGS. 1-2)) for the experiment. When the housing is provided, the discharging end (e.g., 122 (FIGS. 1-2), 322 (FIG. 3), or 422 (FIGS. 4-5)) of the ramp can be located within the interior space, and measuring the airborne particles in block 630 further can include measuring, by the sensor, the airborne particles within the interior space to determine the dustiness of the product.

Although apparatuses and methods configured to measure dustiness of a product have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any components of the apparatuses disclosed herein, as well as the acts or steps to measure the dustiness of the product, may be modified, and that the foregoing discussion of certain of these embodiments does not necessarily represent a complete description of all possible embodiments.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An apparatus for measuring dustiness of a product comprising:
   a ramp comprising a dam, wherein:
      the dam is configured to control a mass flow rate of the product moved by gravity down the ramp; and
   a sensor configured to measure airborne particles generated by the product exiting the ramp and freely falling onto a support surface to determine the dustiness of the product.

2. The apparatus of claim 1, further comprising:
   a container comprising:
      a container body configured to hold the product; and
      a door configured to close or open the container body,
   wherein:
      when the door is open, the container body discharges the product to the ramp.

3. The apparatus of claim 2, wherein the door and the ramp are configured so that the door, when open, lies on the ramp.

4. The apparatus of claim 1, further comprising:
   a housing comprising an interior space,
   wherein:
      a discharging end of the ramp is located within the interior space; and
      the sensor is configured to measure the airborne particles within the interior space.

5. The apparatus of claim 1, wherein at least one of:
   the ramp further comprises an angle of inclination relative to the support surface in a range of approximately 50 degrees to approximately 60 degrees; or
   the sensor has an adjustable height.

6. The apparatus of claim 1 further comprising a sensor holder, wherein:
   the sensor holder comprises:
      a rail with multiple height levels; and
      a platform configured to support the sensor at one of the multiple height levels.

7. The apparatus of claim 1 further comprising a wall, wherein:
   at least a portion of the wall has a background color that is in clear contrast with a color of the product; and
   the sensor is configured to detect the airborne particles against the background color of the at least the portion of the wall to determine the dustiness of the product.

8. An apparatus for measuring dustiness of a product comprising:
   a container comprising:
      a container body configured to hold the product; and
      a door configured to close or open the container body;
   a ramp, wherein:
      the ramp is configured to:
         receive the product discharged from the container body when the door is open; and
         allow gravity to move the product down the ramp; and
      the ramp further is configured so that the door, when open, lies on a surface of the ramp; and
   a sensor configured to measure airborne particles generated by the product exiting the ramp and freely falling onto a support surface for determining the dustiness of the product.

9. The apparatus of claim 8, further comprising:
   a housing comprising an interior space,
   wherein:
      a discharging end of the ramp is located within the interior space; and
      the sensor is configured to measure the airborne particles within the interior space.

10. The apparatus of claim 8, wherein at least one of:
    the ramp further comprises an angle of inclination relative to the support surface in a range of approximately 50 degrees to approximately 60 degrees; or
    the sensor has an adjustable height.

11. The apparatus of claim 8 further comprising a sensor holder, wherein:
    the sensor holder comprise:
       a rail with multiple height levels; and
       a platform configured to support the sensor at one of the multiple height levels.

12. The apparatus of claim 8 further comprising a wall, wherein:
    at least a portion of the wall is of a background color that is in clear contrast with a color of the product; and
    the sensor is configured to detect the airborne particles against the background color of the at least the portion of the wall to determine the dustiness of the product.

13. The apparatus of claim 8, wherein:
    the ramp further comprises a dam configured to control a mass flow rate of the product moved down the ramp.

14. A method for measuring dustiness of a product, the method comprising:
    providing the product onto a ramp;
    allowing gravity to move the product down the ramp through a dam, wherein:
       the dam is configured to control a mass flow rate of the product moved down the ramp; and
    measuring, by a sensor, airborne particles to determine the dustiness of the product, wherein the airborne particles are generated by the product exiting the ramp and freely falling onto a support surface.

15. The method of claim 14, wherein:
    providing the product onto the ramp further comprises:
       using a container to hold the product; and
       opening a door of the container to discharge the product from the container onto the ramp; and
    allowing gravity to move the product further comprises:
       allowing gravity to move the product from the door of the container onto the ramp, down the ramp through the dam, and to exit the ramp.

16. The method of claim 15, wherein the door and the ramp are configured so that the door, when open, lies on the ramp.

17. The method of claim 14, further comprising:
    providing a housing having an interior space,
    wherein:
       measuring, by the sensor, the airborne particles further comprises measuring, by the sensor, the airborne particles within the interior space to determine the dustiness of the product.

18. The method of claim 14, wherein at least one of:
    the ramp further comprises an angle of inclination relative to the support surface in a range of approximately 50 degrees to approximately 60 degrees; or
    the method further comprises, before providing the product onto the ramp and before measuring the airborne particles, adjusting a height of the sensor.

19. The method of claim 14 further comprising:
    adjusting a height of the sensor, comprising:
       providing a platform configured to support the sensor; and coupling the platform supporting the sensor to one of multiple height levels of a rail so that the sensor reaches the height.

20. The method of claim 14, wherein:
at least a portion of a wall has a background color so that the sensor can detect the airborne particles against the at least the portion of the wall having the background color; and
measuring, by the sensor, the airborne particles further comprises:
   measuring, by the sensor, the airborne particles against the background color of the at least the portion of the wall to determine the dustiness of the product.

* * * * *